US011102975B2

(12) United States Patent
Perry

(10) Patent No.: US 11,102,975 B2
(45) Date of Patent: Aug. 31, 2021

(54) RODENTICIDE

(71) Applicant: Stephen C. Perry, Norwood, MA (US)

(72) Inventor: Stephen C. Perry, Norwood, MA (US)

( * ) Notice: Subject to any disclaimer, the term of this patent is extended or adjusted under 35 U.S.C. 154(b) by 0 days.

(21) Appl. No.: 15/943,897

(22) Filed: Apr. 3, 2018

(65) Prior Publication Data

US 2019/0297878 A1 Oct. 3, 2019

(51) Int. Cl.
| | |
|---|---|
| *A01N 25/04* | (2006.01) |
| *A01N 25/00* | (2006.01) |
| *A23K 10/22* | (2016.01) |
| *A23K 10/30* | (2016.01) |
| *A01N 31/02* | (2006.01) |
| *A01N 43/16* | (2006.01) |
| *A01N 59/08* | (2006.01) |
| *A01N 65/00* | (2009.01) |
| *A23L 15/00* | (2016.01) |
| *C08L 1/02* | (2006.01) |
| *C08L 5/08* | (2006.01) |

(52) U.S. Cl.
CPC ........... *A01N 25/004* (2013.01); *A01N 31/02* (2013.01); *A01N 43/16* (2013.01); *A01N 59/08* (2013.01); *A01N 65/00* (2013.01); *A23K 10/22* (2016.05); *A23K 10/30* (2016.05); *A23L 15/00* (2016.08); *C08L 1/02* (2013.01); *C08L 5/08* (2013.01)

(58) Field of Classification Search
CPC ...... A01N 25/004; A01N 59/08; A23K 10/22; A23K 10/30; A23K 15/00; C08L 5/08; C08L 1/02
See application file for complete search history.

(56) References Cited

U.S. PATENT DOCUMENTS

| | | | |
|---|---|---|---|
| 5,750,128 A | 5/1998 | Paulson | |
| 6,114,384 A | 9/2000 | Bessette et al. | |
| 6,586,470 B1 | 7/2003 | Lojek et al. | |
| 8,574,638 B1 * | 11/2013 | Perry | A01N 65/00 424/725 |
| 2004/0037864 A1 * | 2/2004 | Kalbe | A01N 63/00 424/410 |
| 2006/0073179 A1 * | 4/2006 | Dawson | A01N 61/00 424/405 |
| 2007/0190095 A1 | 8/2007 | Emerson | |
| 2007/0280981 A1 | 12/2007 | Birthisel | |
| 2015/0147289 A1 | 5/2015 | Bajomi et al. | |
| 2015/0329435 A1 * | 11/2015 | Hardy | A01N 65/06 424/529 |
| 2016/0050910 A1 * | 2/2016 | Twydell | A01N 31/06 514/167 |

FOREIGN PATENT DOCUMENTS

WO WO2016108044 A2 * 7/2016

OTHER PUBLICATIONS

Pervez, Pakistan J. Zool., vol. 39(1), pp. 35-43, 2007. (Year: 2007).*
Barlow, title: Chemical analysis of mushrooms shows their nutritional benefits, published Feb. 14, 2005. (Year: 2005).*
Azubuike et al, title: Physicochemical, spectroscopic and thermal properties of microcrystalline cellulose derived from corn cobs; International Journal of Recycling of Organic waste in Agriculture 2012, vol. 1, issue 9, pp. 1-7. (Year: 2012).*
International Search Report for PCT/US2018/27895, dated Jul. 5, 2018, 2 pages.
Written Opinion for PCT/US2018/27895, dated Jul. 5, 2018, 9 pages.

* cited by examiner

*Primary Examiner* — Yanzhi Zhang
(74) *Attorney, Agent, or Firm* — Johnson & Martin, P.A.; James David Johnson

(57) ABSTRACT

A rodenticide composition is described along with a method for using the same to exterminate rodents. The composition features a mixture of a dehydrant for causing dehydration in a rodent, a water-absorbent, hygromorphic carrier for absorbing water and expanding after consumption by the rodent, and a flavoring composition. The carrier can be a source of cellulose or a non-cellulosic material. After consumption of the composition by a rodent, the dehydrant and carrier cause the rodent to experience dehydration. The rodenticide composition may also include an irritant that causes digestive stress to the rodent, which further stresses and dehydrates the rodent. Once the rodenticide composition is prepared, it may be placed in areas frequented by or infested with rodents so as to kill the rodents once they consume the composition. One or more flavorings, coloring agents, and weather resistant materials may also be added to the composition.

4 Claims, No Drawings

RODENTICIDE

FIELD OF THE INVENTION

The invention relates to a pesticide. More particularly, the invention relates to a rodenticide useful for exterminating mammals of the order Rodentia but that is non-toxic to humans and other animals.

BACKGROUND

Pesticides, and particularly rodenticides, can be harmful to humans and other animals that unknowingly consume them or otherwise come into contact with them. In the past, rodenticides ingested intentionally and unintentionally by humans resulted in illness and death. Presently, conventional rodenticides ingested by animals other than the pests (namely, mice and rats) for which they are intended also result in the unintentional killing of those animals. Pet animals and wildlife are both harmed or killed by conventional rodenticide usage.

Vomiting (also called emesis) is a reflexive act caused by coordinated contractions of various muscles that eject stomach contents forcefully through an animal's mouth. Humans and many other animals are capable of vomiting as a natural reaction to purge toxic substances from the body. During vomiting, the muscles of the abdomen and chest contract and the diaphragm spasms downward and inward exerting pressure on the stomach. Next, and nearly simultaneously, the cardiac sphincter, which is a part of the diaphragm surrounding the esophagus, relaxes to assist in opening the esophagus. The longitudinal muscle of the esophagus contracts, which further opens the cardiac sphincter, and the resulting pressure forces contents of the stomach up into the esophagus and out of the animal's mouth.

Rats and many other rodents (species of the order Rodentia) are unable to vomit, i.e., cannot produce an emetic reflex. Physiologically, rats have a powerful barrier between the stomach and the esophagus but lack sufficient esophageal muscle strength to overcome and open this barrier by force, which is necessary for vomiting. In humans and other animals, the emetic reflex requires that two muscles of the diaphragm contract independently, but rats are unable to dissociate the activity of these two muscles so that they may produce the independent contractions necessary for vomiting. In addition, rats lack complex neural connections that are present within the brain stem and between the brain stem and viscera of humans and other animals that coordinate the numerous muscles that produce the emetic reflex.

While rats are unable to vomit, they do exhibit other behavior-based techniques to avoid consumption of and poisoning by toxic substances. For example, rats learn to avoid certain foods that make them sick. When a rat discovers a new food, the rat consumes a small amount of the food, and if the rat becomes ill after ingesting the food, the rat learns to scrupulously avoid that food in the future. Rats learn to identify the food that is to be avoided by its taste and smell. Rats experiencing nausea also display pica, which is the consumption of clay or other non-food materials. By ingesting clay, some toxins are bound in the rat's stomach, which assists in reducing the effects of the toxin as experienced by the rat.

While rats are unable to vomit, they can regurgitate. Regurgitation is not the same as emesis and does not produce the forceful expulsion of the stomach contents through the esophagus and out of the mouth. In studies, when a rat is fed a diet of bulky food items, when the rat regurgitates stomach contents, the regurgitant is pasty and thick in composition and, as a result of the rat's tongue action, becomes packed as a plug within the rat's pharynx, larynx and esophagus. Because the regurgitant forms a plug, the rat chokes and often dies.

The rat's esophagus includes inner circular and outer longitudinal layers of striated muscle. These two layers of striated muscle become smooth muscle near the esophagus's point of attachment with the rat's stomach. A gastroesophageal barrier separates and closes off the rat's esophagus from its stomach. The gastroesophageal barrier is formed by a crural sling, a lower esophageal sphincter, and intraabdominal esophagus that lie between the crural sling and lower esophageal sphincter. The crural sling is part of the rat's diaphragm and is composed of a U-shaped bundle of fibers that wraps around the esophagus and attaches to the rat's vertebrae so that when the crural sling contracts, the rat's esophagus is pinched closed. The rat's diaphragm is formed by two muscles: the crural sling and the costal muscle, which is attached to the rat's rib cage. The lower esophageal sphincter is a circular muscle that surrounds the base of the esophagus and, at its lower edge, includes muscle fibers that insert into the limiting ridge, as described below.

The stomach of a rat includes two parts, i.e., a forestomach and a corpus. The forestomach is a non-glandular, thin-walled portion that receives the esophagus and serves as an initial holding chamber for food that is consumed. In rats, the forestomach's walls are similar to walls of the rat's esophagus. Unlike the forestomach, the corpus is a glandular, thick-walled section having walls that include secretory glands, which produce mucus and digestive enzymes. In rats, digestion begins in the stomach's corpus. A pyloric sphincter controls movement of stomach contents from the corpus into the intestines. The forestomach and corpus are separated by a limiting ridge (also called the margo plicatus), a low fold of tissue that extends circumferentially from the large curvature of the stomach to the small curvature of the stomach just below the esophagus. At the esophagus, the limiting ridge forms a U-shape that nearly surrounds the esophageal opening into the forestomach and the muscle fibers of the lower esophageal sphincter are inserted into the limiting ridge. Due to this anatomical structure, when a rat's lower esophageal sphincter contracts, both the walls of the rat's esophagus and the sides of the limiting ridge's U-shaped portion are pulled together, which tightly closes the esophageal opening in the rat's stomach thereby preventing stomach contents from being expelled by vomiting.

Pressure at the two ends of a rat's gastroesophageal barrier is much higher than the pressure found in the rat's thorax or abdomen during any phase of the breathing cycle. The strength and pressure of this barrier make reflux in rats nearly impossible although rats may engage in regurgitation. Rats are not capable of vomiting because, for several reasons explained below, they cannot produce the necessary coordinated muscular contractions to overcome this powerful barrier.

Rats are incapable of relaxing the crural sling while simultaneously contracting the remainder of the diaphragm. The rat's esophagus passes through the crural sling, and as explained above, when the crural sling of the diaphragm contracts, the rat's esophagus is pinched tightly closed. Rats are physiologically incapable of dissociating the activity of the crural sling and costal muscle of their diaphragm, and as a result, a rat cannot relax the crural sling while simultaneously contracting the costal muscle. Instead, in rats as opposed to in humans, both diaphragm muscles always contract or relax together. Rats' inability to separately and selectively control its two diaphragmatic muscles render their bodies incapable of producing the pressure on the stomach necessary to open the crural sling so as to allow their stomach contents to be expelled.

Rats are also unable to open their esophageal sphincter to permit the forceful expulsion of stomach contents during vomiting. In rats, the esophagus consists of a thin, weak unstriated, longitudinal muscle at its point of connection with the stomach, which is not sufficiently strong to open the rat's lower esophageal sphincter so as to allow expulsion of the rat's stomach contents.

Unlike emetic animals (including humans), rats and other nonemetics lack neural connections within the brain and between the brainstem and viscera that are necessary to coordinate the numerous muscles that produce the emetic reflex. While the brainstem nuclei and the muscle systems used in vomiting are present in rats and other nonemetics, the complex neural connections between the nuclei or between the brainstem and viscera, which are necessary to produce coordinated muscular contractions required for vomiting, are absent.

A need exists for a rodenticide that is safe and non-toxic if consumed by humans or non-rodent pets and wildlife.

SUMMARY

The invention relates to a rodenticide composition and method for using the same to exterminate rodents. The rodenticide composition can be manufactured and produced using all-natural ingredients with no synthetic additives so that it is non-toxic, biodegradable, and safe if ingested or contacted by humans or other animals. The rodenticide composition can also be manufactured and produced using synthetic ingredients or a combination of natural and synthetic ingredients. The rodenticide composition features a mixture of a dehydrant for causing dehydration in a rodent, a water-absorbent, hygromorphic carrier for absorbing water and expanding after consumption by the rodent, and a flavoring composition. The carrier can be a source of cellulose or a non-cellulosic material. After consumption of the composition by a rodent, the dehydrant and carrier cause the rodent to experience dehydration. The rodenticide composition may also include an irritant that causes digestive stress to the rodent, which further stresses and dehydrates the rodent. Examples of these ingredients and of other ingredients that may be included in the rodenticide composition are identified in U.S. Pat. No. 8,574,638, which is incorporated in its entirety herein by this reference.

Flavoring to entice consumption and weather resistant material to prolong effectiveness when exposed to water and the elements may also be added to the composition. One or more coloring agents optionally may also be added to the composition as ingredients. Once the rodenticide composition is prepared, it may be placed in areas frequented by or infested with rodents so as to kill the rodents once they consume the composition. The rodenticide is effective for exterminating various species of rodents including rats, mice, voles, chipmunks, ground squirrels, groundhogs, nutrias, beavers, and other rodent pests that are species of the order Rodentia.

Because rats do not have an emetic reflex as do humans and some other animals, rats cannot experience emesis (i.e., vomiting) to expel the contents of the stomach through the mouth. This physiological feature of rats and some other rodents provides a means for creating non-toxic rodenticides that are safe if consumed by humans, pets, or other non-rodent wildlife while being lethal to rats. The rodenticide composition can be consumed as a food source by rats. After ingestion of the rodenticide composition, dehydration of the rat commences, which causes the rat's blood to thicken as well as circulatory collapse. A rat that has consumed the rodenticide composition will become lethargic and retreat to its burrow where it lapses into a coma and dies. Rodent activity declines as death occurs within 4 to 7 days after regular ingestion of the rodenticide composition.

The rodenticide composition provides an advantage in that it is non-toxic to humans and other non-rodent animals. The rodenticide composition is also advantageous because it can be prepared efficiently and inexpensively from readily available, plentiful, inexpensive ingredients. The rodenticide composition also provides an advantage in that rodents that consume it do not immediately experience symptoms of poisoning, and thus, are undeterred in consuming it as they often are by learning after consuming small portions of other rodenticides. The rodenticide composition provides still another advantage in that a rodent's consumption of soil will not work to counteract the lethal effects of the composition because it is not a traditional rodenticide that contains toxins.

Accordingly, the invention features a rodenticide that includes a dehydrant for causing dehydration in a rodent; a water-absorbent, hygromorphic carrier; and a flavoring composition that includes a binding agent.

In another aspect, the invention can feature the carrier including a source of cellulose that is or includes a grain-based cellulosic composition, a nut-based cellulosic composition, a legume-based cellulosic composition, a starchy tuber-based cellulosic composition, cellulose fibers, carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, any other suitable source of cellulose, a combination of two or more of the foregoing, or any other suitable material derived from any of the foregoing.

In another aspect, the invention can feature the carrier being or including a source of alpha cellulose.

In another aspect, the invention can feature the carrier being or including fish meal.

In another aspect, the invention can feature the carrier being or including a source of alpha cellulose and fish meal.

In another aspect, the invention can feature the rodenticide composition further including an additional carrier that includes a source of chitin.

In another aspect, the invention can feature the carrier including, at least in part, a fungus or derivative thereof.

In another aspect, the invention can feature the dehydrant being or including a grain-based cellulosic composition, a nut-based cellulosic composition, a legume-based cellulosic composition, a starchy tuber-based cellulosic composition, activated alumina, aerogel, benzophenone, bentonite clay, calcium chloride, calcium sulfate, caramel, cellulose fibers, cobalt (II) chloride, copper (II) sulfate, ethanol, glycerol, honey, lithium bromide, lithium chloride, magnesium perchlorate, magnesium sulfate, methanol, perlite, potassium carbonate, potassium hydroxide, silica, silica gel, fumed silica, sodium, sodium chlorate, sodium chloride, sodium hydroxide, sucrose, sulfuric acid, vermiculite, zinc chloride, any other suitable dehydrant, a combination of two or more of the foregoing, or any other suitable material derived from any of the foregoing.

In another aspect, the invention can feature the rodenticide composition further including an additional ingredient, wherein the additional ingredient is or includes alfalfa, portabella, shiitake, another mushroom, another fungus, poultry egg powder, white bean, wheat germ oil, an irritant, or a combination of two or more of the foregoing.

In another aspect, the invention can feature the flavoring composition being or including cocoa, peanut butter, cheese, egg yolk, sulfur, fish oil, fish meal, dimethyl disulfide, syrup, peanuts, sorbitol, sucralose, sucrose, fructose, molasses, sweet molasses, soy molasses, cat food, malt flavor, nutria meat, dried blood, any other suitable flavoring, a combination of two or more of the foregoing, or any other suitable material derived from any of the foregoing.

In another aspect, the invention can feature the flavoring composition being or including molasses, sweet molasses, soy molasses, or a combination of two or more of the foregoing.

In another aspect, the invention can feature the rodenticide composition further including fish meal, a meat-based cat food, a fish-based cat food, or a combination of two or more of the foregoing.

The invention also features a rodenticide composition that includes a dehydrant for causing dehydration in a rodent; a water-absorbent, hygromorphic carrier; a binding agent; an optional flavoring composition; an additional carrier that includes a source of chitin; and poultry egg powder. The dehydrant includes cellulose fibers, silica gel, perlite, sodium chloride, or a combination of two or more of the foregoing.

In another aspect, the invention can feature the binding agent being or including molasses, sweet molasses, soy molasses, or a combination of two or more of the foregoing.

In another aspect, the invention can feature the optional flavoring composition being or including cocoa, peanut butter, cheese, egg yolk, sulfur, fish oil, fish meal, dimethyl disulfide, syrup, peanuts, sorbitol, sucralose, sucrose, fructose, molasses, cat food, malt flavor, nutria meat, dried blood, any other suitable flavoring, a combination of two or more of the foregoing, or any other suitable material derived from any of the foregoing.

In another aspect, the invention can feature the rodenticide composition further including an additional ingredient that is or includes alfalfa, white bean, wheat germ oil, an irritant, or a combination of two or more of the foregoing.

In another aspect, the invention can feature the carrier including a source of cellulose that is or includes a grain-based cellulosic composition, a nut-based cellulosic composition, a legume-based cellulosic composition, a starchy tuber-based cellulosic composition, cellulose fibers, carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, any other suitable source of cellulose, a combination of two or more of the foregoing, or any other suitable material derived from any of the foregoing.

In another aspect, the invention can feature the carrier being or including a source of alpha cellulose.

In another aspect, the invention can feature the carrier including a source of alpha cellulose and fish meal.

In another aspect, the invention can feature the source of chitin being or including portabella, shiitake, another mushroom, another fungus, a combination of two or more of the foregoing, or another source of chitin.

In another aspect, the invention can feature the dehydrant further being or including a grain-based cellulosic composition, a nut-based cellulosic composition, a legume-based cellulosic composition, a starchy tuber-based cellulosic composition, activated alumina, aerogel, benzophenone, bentonite clay, calcium chloride, calcium sulfate, caramel, cobalt (II) chloride, copper (II) sulfate, ethanol, glycerol, honey, lithium bromide, lithium chloride, magnesium perchlorate, magnesium sulfate, methanol, potassium carbonate, potassium hydroxide, silica, fumed silica, sodium, sodium chlorate, sodium hydroxide, sucrose, sulfuric acid, vermiculite, zinc chloride, any other suitable dehydrant, a combination of two or more of the foregoing, or any other suitable material derived from any of the foregoing.

In another aspect, the invention can feature the dehydrant being or including sodium chloride or perlite.

The invention also features a rodenticide composition that includes: (1) a dehydrant for causing dehydration in a rodent, the composition including the dehydrant in an amount of about 45 to about 55 percent by weight of the composition, wherein the dehydrant is or includes cellulose fibers, silica gel, or both; (2) a water-absorbent, hygromorphic carrier in an amount of about 38 to about 45 percent by weight of the composition, wherein the carrier is or includes a source of cellulose; and (3) a flavoring composition that is or includes a binding agent, in an amount of about 6.5 to about 7 percent by weight of the composition.

In another aspect, the invention can feature the carrier including a source of cellulose that is or includes a grain-based cellulosic composition, a nut-based cellulosic composition, a legume-based cellulosic composition, a starchy tuber-based cellulosic composition, cellulose fibers, carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, any other suitable source of cellulose, a combination of two or more of the foregoing, or any other suitable material derived from any of the foregoing.

In another aspect, the invention can feature the carrier further including a source of chitin that is or includes a mushroom, another fungus, or a combination of both.

In another aspect, the invention can feature the carrier further including fish meal.

In another aspect, the invention can feature the dehydrant being or including a grain-based cellulosic composition, a nut-based cellulosic composition, a legume-based cellulosic composition, a starchy tuber-based cellulosic composition, activated alumina, aerogel, benzophenone, bentonite clay, calcium chloride, calcium sulfate, caramel, cellulose fibers, cobalt (II) chloride, copper (II) sulfate, ethanol, glycerol, honey, lithium bromide, lithium chloride, magnesium perchlorate, magnesium sulfate, methanol, perlite, potassium carbonate, potassium hydroxide, silica, silica gel, fumed silica, sodium, sodium chlorate, sodium chloride, sodium hydroxide, sucrose, sulfuric acid, vermiculite, zinc chloride, any other suitable dehydrant, a combination of two or more of the foregoing, or any other suitable material derived from any of the foregoing.

In another aspect, the invention can feature the binding agent being or including molasses, sweet molasses, soy molasses, or a combination of two or more of the foregoing.

In another aspect, the invention can feature the rodenticide composition further including an additional ingredient that is or includes alfalfa, a source of chitin, poultry egg powder, white bean, wheat germ oil, an additional flavoring composition that is not a binding agent, an irritant, or a combination of two or more of the foregoing.

The invention also features a rodenticide composition including a dehydrant for causing dehydration in a rodent, a water-absorbent, hygromorphic carrier, a source of alpha cellulose, an irritant, whole egg solids, soybean oil, paraffin wax, fish meal, and sorbitol. The dehydrant is or includes sodium chloride, cellulose fibers, silica gel, perlite, or a combination of two or more of the foregoing.

In another aspect, the invention can feature the carrier being or including corn cobs and the dehydrant being or including sodium chloride.

In another aspect, the invention can feature the carrier being or including a fungal source of chitin.

In another aspect, the invention can feature the irritant including citric acid, calcium carbonate, and coffee grounds.

A method of the invention can be used to exterminate rodents, and the method can include the steps of: (a) preparing a rodenticide composition that includes a mixture of: a dehydrant for causing dehydration in a rodent; a water-absorbent, hygromorphic carrier for absorbing water and expanding after consumption by the rodent; and a flavoring composition; and (b) placing an amount of the rodenticide composition sufficient to kill the rodent in an area in which the extermination of rodents is desired, wherein the rodent is killed after consuming the rodenticide composition.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention is best understood by reference to the description set forth herein. Those skilled in the art will readily appreciate that the detailed description given herein is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention is not limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides a rodenticide composition and method for using the same to exterminate rodents. The composition features a mixture of a natural dehydrant capable of dehydrating a rodent that consumes it, a natural carrier matrix, and an optional flavoring. The optional flavoring can be one or more natural or artificial flavors or combinations thereof. The optional flavoring, when included in the composition, may be present in a range of from about 0.1% to about 5% by weight. For example, the optional flavoring could be included in the rodenticide composition in about 0.01, 0.05, 0.09, 0.1, 0.2, 0.25, 0.3, 0.4, 0.41, 0.45, 0.49, 0.5, 0.51, 0.55, 0.59, 0.6, 0.7, 0.75, 0.8, 0.9, 0.91, 0.95, 0.99, or 1 percent by weight. The rodenticide composition can include the optional flavoring in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

The natural carrier matrix can feature a flour or meal of a carbohydrate, lipid, or protein. More particularly, the natural carrier matrix can include a plant-derived grain-based composition, a nut-based composition, a legume-based composition, a starchy tuber-based composition, or combinations or derivatives of one or more of the foregoing. The natural carrier matrix can be included in the rodenticide composition in a percentage by weight of about 90% to about 99%. For example, the natural carrier matrix may be incorporated into the rodenticide composition in about 80, 81, 82, 83, 85, 86, 88, 89, 89.1, 89.25, 89.5, 89.7, 89.9, 90, 90.1, 90.25, 90.5, 90.8, 90.9, 91, 92, 92.1, 92.25, 92.5, 92.75, 92.9, 93, 93.1, 93.25, 93.5, 93.75, 93.9, 94, 94.1, 94.25, 94.5, 94.75, 94.9, 95, 95.1, 95.25, 95.5, 95.75, 95.9, 96, 97, 97.1, 97.25, 97.5, 97.75, 97.9, 98, 98.1, 98.25, 98.5, 98.75, 98.9, 99, 99.1, 99.25, 99.5, 99.7, 99.9, or 99.99 percent by weight. In a preferred range, the rodenticide composition can include the natural carrier matrix in a percentage by weight of about 93% to about 99%. In a most preferred range, the rodenticide composition can include the natural carrier matrix in a percentage by weight of about 95% to about 98%. The rodenticide composition can include the natural carrier matrix in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

The natural dehydrant can be corn gluten meal, soy hydrolysate, soybean oil, castor oil, linseed oil, sodium chloride, cottonseed oil, any other suitable natural dehydrant, combinations thereof, or any other suitable material derived from any of the foregoing. The natural dehydrant may be included in the rodenticide composition in a percentage by weight of about 0.5% to about 10%. For example, the natural dehydrant may be incorporated into the rodenticide composition in about 0.05, 0.1, 0.2, 0.25, 0.3, 0.4, 0.41, 0.45, 0.49, 0.5, 0.51, 0.55, 0.59, 0.6, 0.7, 0.75, 0.8, 0.9, 0.91, 0.95, 0.99, 1, 1.01, 1.1, 1.25, 1.5, 1.75, 1.9, 2, 2.1, 2.25, 2.5, 2.75, 2.9, 3, 4, 4.1, 4.25, 4.5, 4.75, 4.9, 5, 5.1, 5.25, 5.5, 5.75, 5.9, 6, 6.1, 6.25, 6.5, 6.75, 6.9, 7, 7.1, 7.25, 7.5, 7.75, 7.9, 8, 9, 9.1, 9.25, 9.5, 9.75, 9.9, 10, 10.1, 10.25, 10.5, 10.75, 10.9, 11, 12, 15, 16, 17, 18, 19, or 20 percent by weight. In a preferred range, the rodenticide composition can include the natural dehydrant in a percentage by weight of about 1% to about 7%. In a most preferred range, the rodenticide composition can include the natural dehydrant in a percentage by weight of about 2% to about 5%. Once the rodenticide composition is prepared, it may be placed in areas frequented by or infested with rodents so as to kill the rodents once they consume the composition. The rodenticide composition can include the dehydrant in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

In one embodiment, the natural carrier matrix can be a cellulosic grain-based composition. The cellulosic grain-based composition can be prepared from corn cobs, corn starch, corn meal, corn flour, rice, rice flour, wheat flour, any other suitable grain-based material, combinations thereof, or any other suitable material derived from any of the foregoing.

In another embodiment, the natural carrier matrix can be a cellulosic nut-based composition. The cellulosic nut-based composition can be prepared from nut meal, any other suitable nut-based material, combinations thereof, or any other suitable material derived from any of the foregoing.

In another embodiment, the natural carrier matrix can be a cellulosic legume-based composition. The cellulosic legume-based composition can be prepared from soybean meal, soybean flour, soybean hulls, peanut fiber, peanut powder, peanut oil, peanut flour, peanut shell fibers, alfalfa, any other suitable legume-based material, combinations thereof, or any other suitable material derived from any of the foregoing.

In another embodiment, the natural carrier matrix can be a cellulosic starchy tuber-based composition. The cellulosic starchy tuber-based composition can be prepared from potato starch, potato meal, potato flour, any other suitable starchy tuber-based material, combinations thereof, or any other suitable material derived from any of the foregoing.

In one example of an exemplary embodiment of the rodenticide composition, the composition can include, in percentages by weight, about 1% white bean powder, about 1% wheat flour, about 5% sweet molasses, and about 93% corn cob powder. Optionally, natural or artificial flavors may also be included.

In an example of another exemplary embodiment of the rodenticide composition, the composition can include, in percentages by weight, about 5% soybean oil, about 5% soybean meal, about 8% soybean flour, about 5% soy molasses, and about 77% soybean hull powder. Optionally, natural or artificial flavors may also be included.

Example 1

In an example of another exemplary embodiment, the rodenticide composition can include corn meal, wheat germ oil, wheat flour, molasses, and corn cob powder. These ingredients can be present, in percentages by weight, of about 0.5% to about 5% corn meal, about 0.5% to about 5% wheat germ oil, about 0.5% to about 10% wheat flour, about 1% to about 15% molasses, and about 60% to about 99% corn cob powder. In a more preferred embodiment containing this set of ingredients, the ingredients can be present, in percentages by weight, of about 0.75% to about 2% corn meal, about 0.75% to about 3% wheat germ oil, about 0.75% to about 6% wheat flour, about 2% to about 12% molasses, and about 68% to about 95% corn cob powder. In a most preferred embodiment containing this set of ingredients, the ingredients can be present, in percentages by weight, of about 1% to about 2% corn meal, about 1% to about 3% wheat germ oil, about 1% to about 6% wheat flour, about 2% to about 5% molasses, and about 84% to about 95% corn cob powder. Optionally, natural or artificial flavors may also be included in any of the embodiments of the rodenticide composition.

Example 2

In an example of another exemplary embodiment, the rodenticide composition can include, in percentages by weight, about 0.5% to about 5% soy bean oil, about 0.5% to about 5% soy bean meal, about 0.5% to about 10% soy bean flour, about 1% to about 15% soy molasses, and about 60% to about 99% soy bean hulls. In a more preferred embodiment containing this set of ingredients, the ingredients of the rodenticide composition can include, in percentages by weight, about 0.75% to about 2% soy bean oil, about 0.75% to about 3% soy bean meal, about 0.75% to about 6% soy bean flour, about 2% to about 12% soy molasses, and about 80% to about 95% soy bean hulls. In a most preferred embodiment containing this set of ingredients, the ingredients of the rodenticide composition can include, in percentages by weight, about 1% to about 2% soy bean oil, about 1% to about 3% soy bean meal, about 1% to about 6% soy bean flour, about 2% to about 5% soy molasses, and about 84% to about 95% soy bean hulls. Optionally, natural or artificial flavors may also be included in any of the embodiments of the rodenticide composition.

In addition to the main ingredients described herein above, the rodenticide composition can include one or more of the following optional ingredients: *Medicago sativa* (alfalfa), portabella mushrooms, shitake mushrooms, and poultry egg powder. *Medicago sativa* (alfalfa) is a natural carrier matrix. Portabella mushrooms, shitake mushrooms, and poultry egg powder are each natural dehydrants. In exemplary embodiments containing one or more of the optional ingredients, in addition to two or more of the main ingredients described herein above, the rodenticide composition can include one or more of the optional ingredients in the following percentages by weight: about 15% to about 99% by weight alfalfa, about 1% to about 20% portabella mushrooms, about 1% to about 20% shitake mushrooms, and about 1% to about 20% poultry egg powder. In more preferred embodiments containing one or more of the optional ingredients, in addition to two or more of the main ingredients described herein above, the rodenticide composition can include one or more of the optional ingredients in the following percentages by weight: about 30% to about 70% by weight alfalfa, about 3% to about 15% portabella mushrooms, about 3% to about 15% shitake mushrooms, and about 3% to about 15% poultry egg powder. In most preferred embodiments containing one or more of the optional ingredients, in addition to two or more of the main ingredients described herein above, the rodenticide composition can include one or more of the optional ingredients in the following percentages by weight: about 45% to about 65% by weight alfalfa, about 5% to about 12% portabella mushrooms, about 5% to about 12% shitake mushrooms, and about 5% to about 12% poultry egg powder.

Indoor and outdoor test trials were conducted using one or more embodiments of the rodenticide composition as described in Examples 1 and 2 above.

Indoor Trial

Prior to treatment using the rodenticide composition, all likely food sources were removed from the indoor testing site. Samples of the rodenticide composition were placed in locations of the indoor testing site where fresh signs of rodent activity were found, e.g., fresh droppings. Sixty grams of the rodenticide composition of Example 1 was placed into each of several small feed trays spaced approximately 36 inches apart throughout the infested indoor area. Activity and mortality was examined by counting dead or moribund species found within 10 feet of the feed trays over a 10-day period. After five days, no fresh droppings were found and three rodent carcasses had been collected. Two of the carcasses were of the common house mouse (*Mus musculus*) and one carcass was of the common brown rat (*Rattus norvegicus*).

Outdoor Trial

Samples of the rodenticide composition were placed in locations of the outdoor testing site fresh signs of rodent activity were found, e.g., fresh droppings and near burrows, runways, feeding places, and at points of entry around the perimeter of a utilized building. Sixty grams of the rodenticide composition of Example 2 were placed in open shallow feed trays or wrapped in cling film and placed in drainpipes, open-ended boxes, or under sheets of metal/wood secured at an angel against a wall (to keep the product dry) at intervals of approximately two yards (72 inches reducing to approximately 1.5 yards in areas of suspected high infestation). Activity and mortality was examined by counting dead or moribund species found within 20 feet of the feed trays over a 10-day period. After six days a dramatic decrease in fresh droppings was recorded and seven rodent carcasses had been collected. Three of the carcasses were of the common house mouse (*Mus musculus*), three carcasses were of the common brown rat (*Rattus norvegicus*), and one carcass was of the common deer mouse (*Peromyscus maniculatus*).

The invention also features a method that can be used to exterminate rodents. In a first step of the method, a rodenticide composition, as described herein above, that includes a mixture of a natural dehydrant and a natural carrier matrix, wherein the natural carrier matrix features a cellulosic composition that is grain-based, nut-based, legume-based, or starchy tuber-based, is prepared. Once the rodenticide composition has been prepared, in a next step of the method, an amount of the rodenticide composition sufficient to kill a rodent is placed in an area in which the extermination of rodents is desired, wherein the rodent is killed after consuming the rodenticide composition.

The invention also provides a rodenticide composition that includes a composition for producing endogenous gas and a method for using the same to exterminate rodents. The rodenticide composition includes a mixture of: a dehydrant, a composition for producing endogenous gas, a dietary emulsifier, and a source of cellulose. In the most exemplary embodiments, the rodenticide composition will also include a hypercalcemia promoter. In other exemplary embodiments, the rodenticide composition can include one or more irritants as ingredients. In some embodiments, the rodenticide composition can also include a flavoring, a weathering agent, or both.

The dehydrant of the rodenticide is a composition or ingredient that causes a rodent to experience dehydration after it is consumed. Hygroscopic desiccant materials are useful as dehydrants in the rodenticide due to their ability to absorb water from their surroundings (in this case, water in the rodent's digestive system). Such hygroscopic materials can also include deliquescents that readily dissolve in water until fully dissolved. Examples of deliquescents include sodium chloride, zinc chloride, calcium chloride, potassium hydroxide, and sodium hydroxide. The dehydrant is selected from among: a grain-based cellulosic composition, a nut-based cellulosic composition, a legume-based cellulosic composition, a starchy tuber-based cellulosic composition, alpha cellulose, cellulose fibers, activated alumina, aerogel, benzophenone, bentonite clay, calcium chloride, calcium sulfate, caramel, cellulose fibers, cobalt (II) chloride, copper (II) sulfate, ethanol, glycerol, honey, lithium bromide, lithium chloride, magnesium perchlorate, magnesium sulfate, methanol, perlite, potassium carbonate, potassium hydroxide, silica, silica gel, fumed silica, sodium, sodium chlorate, sodium chloride, sodium hydroxide, sucrose, sulfuric acid, vermiculite, zinc chloride, any other suitable dehydrant, a combination of two or more of the foregoing, or any other suitable material derived from any of the foregoing. In certain exemplary embodiments, the dehydrant can be one or more naturally occurring compositions or ingredients. In other embodiments, the dehydrant can be one or more artificial or manmade compositions or ingredients. In still other embodiments, the dehydrant can be a mixture of one or more naturally occurring compositions or ingredients and one or more artificial or manmade compositions or ingredients.

In preferred embodiments of the rodenticide composition, the dehydrant is selected from among cellulose fibers, silica gel, perlite, sodium chloride, or a combination of two or more of the foregoing. In the most preferred embodiments of the rodenticide composition, the dehydrant is selected from among cellulose fibers, silica gel, or both.

The dehydrant may be included in the rodenticide composition in a percentage by weight of about 20% to about 60%. For example, the dehydrant may be incorporated into the rodenticide composition in about 15, 16, 17, 17.5, 18, 18.5, 18.75, 18.9, 18.99, 19, 19.01, 19.05, 19.1, 19.2, 19.25, 19.3, 19.4, 19.41, 19.45, 19.49, 19.5, 19.51, 19.55, 19.59, 19.6, 19.7, 19.75, 19.8, 19.9, 19.91, 19.95, 19.99, 20, 20.01, 20.1, 20.2, 20.25, 20.3, 20.4, 20.5, 20.6, 20.7, 20.75, 20.8, 20.9, 20.95, 20.99, 21, 22, 23, 24, 25, 26, 27, 27.5, 28, 29, 30, 35, 40, 41, 41.5, 41.9, 42, 42.1, 42.2, 42.25, 42.3, 42.4, 42.5, 42.6, 42.7, 42.75, 42.8, 42.9, 42.95, 42.99, 43, 43.01, 43.05, 43.09, 43.1, 43.2, 43.25, 43.3, 43.4, 43.5, 43.6, 43.7, 43.75, 43.8, 43.9, 43.91, 43.95, 43.99, 44, 44.1, 44.5, 45, 46, 47, 48, 49, 50, 51, 52, 53, 54, 55, 56, 57, 58, 59, 59.1, 59.2, 59.25, 59.3, 59.4, 59.5, 59.6, 59.7, 59.75, 59.8, 59.9, 59.91, 59.95, 59.99, 60, 60.01, 60.05, 60.09, 60.1, 60.2, 60.25, 60.3, 60.4, 60.41, 60.45, 60.5, 60.51, 60.55, 60.59, 60.6, 60.7, 60.75, 60.8, 60.9, 60.91, 60.95, 60.99, 61, 61.01, 61.1, 61.25, 61.5, 62, 63, 64, 65, 70, 75, 80, 85, 86, 90, or 95 percent by weight. The rodenticide composition can include the dehydrant in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the dehydrant in a percentage by weight of about 20% to about 60%. In a most preferred range, the rodenticide composition can include the dehydrant in a percentage by weight of about 30% to about 50%. In an exemplary embodiment, the dehydrant can be included in the composition at about 43% of the composition by weight.

The composition for producing endogenous gas of the rodenticide composition is an alkali carbonate, a peroxide, yeast, a combination of two or more of the foregoing, or any other suitable material derived from any of the foregoing. Once ingested by a rodent, the composition for producing endogenous gas produces oxygen as the endogenous gas. The endogenous gas causes bloating, discomfort, and digestive stress that decreases the rodent's desire to eat, which further dehydrates the rodent and hastens death. The rodenticide's composition for producing endogenous gas is a composition selected from among: sodium percarbonate, magnesium percarbonate, zinc percarbonate, calcium peroxide, calcium percarbonate, magnesium peroxide, zinc peroxide, sodium perborate, potassium monopersulfate, tetraacetylethylenediamine, yeast, any other suitable composition or ingredient for producing endogenous gas, a combination of two or more of the foregoing, or any other suitable material derived from any of the foregoing. In certain exemplary embodiments, the composition for producing endogenous gas can be one or more naturally occurring compositions or ingredients. In other embodiments, the composition for producing endogenous gas can be one or more artificial or manmade compositions or ingredients. In still other embodiments, the composition for producing endogenous gas can be a mixture of one or more naturally occurring compositions or ingredients and one or more artificial or manmade compositions or ingredients.

In preferred embodiments of the rodenticide composition, the composition for producing endogenous gas is selected from among calcium percarbonate, calcium peroxide or both. In the most preferred embodiments of the rodenticide composition, the composition for producing endogenous gas is calcium percarbonate.

The composition for producing endogenous gas may be included in the rodenticide composition in a percentage by weight of about 2% to about 10%. For example, the composition for producing endogenous gas may be incorporated into the rodenticide composition in about 0.1, 0.101, 0.105, 0.11, 0.12, 0.13, 0.14, 0.15, 0.16, 0.17, 0.18, 0.19, 0.195, 0.199, 0.2, 0.201, 0.205, 0.21, 0.22, 0.225, 0.23, 0.24, 0.241, 0.245, 0.249, 0.25, 0.251, 0.255, 0.26, 0.27, 0.275, 0.28, 0.29, 0.291, 0.295, 0.299, 0.3, 0.31, 0.32, 0.325, 0.33, 0.34, 0.35, 0.36, 0.37, 0.375, 0.38, 0.39, 0.4, 0.41, 0.45, 0.49, 0.5, 0.51, 0.55, 0.59, 0.6, 0.7, 0.75, 0.8, 0.9, 0.91, 0.95, 0.99, 1, 1.01, 1.1, 1.2, 1.25, 1.3, 1.4, 1.5, 1.6, 1.7, 1.75, 1.8, 1.9, 1.95, 1.99, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 3.95, 3.99, 4, 4.01, 4.05, 4.09, 4.1, 4.15, 4.19, 4.2, 42.25, 4.3, 4.4, 4.5, 4.6, 4.7, 4.75, 4.8, 4.9, 4.95, 4.99, 5, 5.01, 5.05, 5.09, 5.1, 5.2, 5.25, 5.3, 5.4, 5.5, 5.6, 5.7, 5.75, 5.8, 5.9, 5.91, 5.95, 5.99, 6, 6.1, 6.5, 7, 7.5, 7.9, 7.95, 7.99, 8, 8.1, 8.2, 8.25, 8.3, 8.4, 8.5, 8.6, 8.7, 8.75, 8.8, 8.9, 9, 9.1, 9.2, 9.25, 9.3, 9.4, 9.5, 9.6, 9.7, 9.75, 9.8, 9.9, 9.91, 9.95, 9.99, 10, 10.1, 10.2, 10.25, 10.3, 10.4, 10.5, 10.6, 10.7, 10.75, 10.8, 10.9, 11, 12, 13, 14, 15, or 20 percent by weight. The rodenticide composition can include the composition for producing endogenous gas in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the composition for producing endogenous gas in a percentage by weight of about 2% to about 10%. In a most preferred range, the rodenticide composition can include the composition for producing endogenous gas in a percentage by weight of about 4% to about 8%. In an exemplary embodiment, the composition for producing endogenous gas can be included in the composition at about 6% of the composition by weight.

The dietary emulsifier is a composition that disrupts the gut microbiota in rodents and promotes colitis and metabolic syndrome. The initial dietary stress caused in the rodent after consumption of the dietary emulsifier contained in the rodenticide reduces the rodent's desire to feed and increases dehydration and hastens death. The rodent's intestine is protected from its microbiota via multi-layered mucus structures that cover the intestinal surface, thereby allowing the vast majority of gut bacteria to be kept at a safe distance from epithelial cells that line the intestine. Agents that disrupt mucus-bacterial interactions can promote diseases associated with gut inflammation. Common food-grade emulsifiers can readily disrupt mucus-bacterial interactions in rodents leading to gut inflammation. Low concentrations of one or both of these two commonly used food grade emulsifiers, carboxymethylcellulose and polyoxyethylene (20) sorbitan monooleate, induce low-grade inflammation and metabolic syndrome in wild-type rodent hosts and promoted robust colitis in mice predisposed to this disorder. Further, polyoxyethylene (20) sorbitan monooleate produces mild to moderate depression of a rodent's central nervous system with a marked reduction in locomotor activity and causes both ataxia and paralytic response.

The dietary emulsifier of the rodenticide composition is carboxymethylcellulose, polyoxyethylene (20) sorbitan monooleate, both, any other suitable dietary emulsifier, or any other suitable material derived from any of the foregoing. In the most preferred embodiments of the rodenticide composition, the composition for producing endogenous gas is polyoxyethylene (20) sorbitan monooleate.

The dietary emulsifier may be included in the rodenticide composition in a percentage by weight of about 0.25% to about 5%. For example, the dietary emulsifier may be incorporated into the rodenticide composition in about 0.001, 0.005, 0.009, 0.01, 0.015, 0.019, 0.02, 0.025, 0.03, 0.04, 0.05, 0.06, 0.07, 0.08, 0.09, 0.095, 0.099, 0.1, 0.101, 0.105, 0.11, 0.12, 0.13, 0.14, 0.15, 0.16, 0.17, 0.18, 0.19, 0.195, 0.199, 0.2, 0.201, 0.205, 0.21, 0.22, 0.225, 0.23, 0.24, 0.241, 0.245, 0.249, 0.25, 0.251, 0.255, 0.26, 0.27, 0.275, 0.28, 0.29, 0.291, 0.295, 0.299, 0.3, 0.31, 0.32, 0.325, 0.33, 0.34, 0.35, 0.36, 0.37, 0.375, 0.38, 0.39, 0.4, 0.41, 0.45, 0.49, 0.5, 0.51, 0.55, 0.59, 0.6, 0.7, 0.75, 0.8, 0.9, 0.91, 0.95, 0.99, 1, 1.01, 1.1, 1.2, 1.25, 1.3, 1.4, 1.5, 1.6, 1.7, 1.75, 1.8, 1.9, 1.95, 1.99, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 3.95, 3.99, 4, 4.01, 4.05, 4.09, 4.1, 4.15, 4.19, 4.2, 42.25, 4.3, 4.4, 4.5, 4.6, 4.7, 4.75, 4.8, 4.9, 4.95, 4.99, 5, 5.01, 5.05, 5.09, 5.1, 5.2, 5.25, 5.3, 5.4, 5.5, 5.6, 5.7, 5.75, 5.8, 5.9, 5.91, 5.95, 5.99, 6, 6.1, 6.5, 7, 8, 9, or 10 percent by weight. The rodenticide composition can include the dietary emulsifier in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the dietary emulsifier in a percentage by weight of about 0.25% to about 5%. In a most preferred range, the rodenticide composition can include the dietary emulsifier in a percentage by weight of about 0.5% to about 3%. In an exemplary embodiment, the dietary emulsifier can be included in the composition at about 1% of the composition by weight.

The hypercalcemia promoter of the rodenticide composition causes long-term hypercalcemia by increasing calcium levels in the blood. Hypercalcemia further causes elevated arterial blood pressure and increased cardiac muscle contraction, which leads to polyuria and dehydration that eventually cause death. The hypercalcemia promoter also causes digestive stress and metabolic disorder in the short term, which reduces the rodent's desire to eat, thereby increasing dehydration and hastening death of the rodent.

The hypercalcemia promoter of the rodenticide composition is selected from among: calcium carbonate, calcium glycerate, calcium citrate, calcium lactate, calcium gluconate, a calcium uptake enhancer, bone meal, any other suitable source of a hypercalcemia promoter, a combination of two or more of the foregoing, or any other suitable material derived from any of the foregoing. The calcium uptake enhancer can be selected from among: cholecalciferol, ergocalciferol, L-lysine, L-Valine, L-tryptophan, any other suitable calcium uptake enhancer, a combination of two or more of the foregoing, or any other suitable material derived from any of the foregoing. Some embodiments of the rodenticide composition may not include a hypercalcemia promoter.

In preferred embodiments of the rodenticide composition, the hypercalcemia promoter is a combination of calcium carbonate and cholecalciferol. In the most preferred embodiments of the rodenticide composition, the hypercalcemia promoter is a combination of calcium carbonate, cholecalciferol, and L-lysine.

The hypercalcemia promoter may be included in the rodenticide composition in a percentage by weight of about 0.05% to about 4%. For example, the hypercalcemia promoter may be incorporated into the rodenticide composition in about 0.001, 0.005, 0.009, 0.01, 0.015, 0.019, 0.02, 0.025, 0.03, 0.035, 0.039, 0.04, 0.041, 0.042, 0.0425, 0.043, 0.044, 0.045, 0.046, 0.047, 0.0475, 0.048, 0.049, 0.0491, 0.0495, 0.0499, 0.05, 0.0501, 0.0505, 0.0509, 0.051, 0.052, 0.0525, 0.053, 0.054, 0.055, 0.056, 0.057, 0.0575, 0.058, 0.059, 0.0591, 0.0595, 0.0599, 0.06, 0.061, 0.065, 0.069, 0.07, 0.08, 0.09, 0.095, 0.099, 0.1, 0.101, 0.105, 0.11, 0.12, 0.13, 0.14, 0.15, 0.16, 0.17, 0.18, 0.19, 0.195, 0.199, 0.2, 0.201, 0.205, 0.21, 0.22, 0.225, 0.23, 0.24, 0.241, 0.245, 0.249, 0.25, 0.251, 0.255, 0.26, 0.27, 0.275, 0.28, 0.29, 0.291, 0.295, 0.299, 0.3, 0.31, 0.32, 0.325, 0.33, 0.34, 0.35, 0.36, 0.37, 0.375, 0.38, 0.39, 0.4, 0.41, 0.45, 0.49, 0.5, 0.51, 0.55, 0.59, 0.6, 0.7, 0.75, 0.8, 0.9, 0.91, 0.95, 0.99, 1, 1.01, 1.1, 1.2, 1.25, 1.3, 1.4, 1.5, 1.6, 1.7, 1.75, 1.8, 1.9, 1.95, 1.99, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 3.95, 3.99, 4, 4.01, 4.05, 4.09, 4.1, 4.15, 4.19, 4.2, 42.25, 4.3, 4.4, 4.5, 4.6, 4.7, 4.75, 4.8, 4.9, 4.95, 4.99, 5, 5.01, 5.05, 5.09, 5.1, 5.2, 5.25, 5.3, 5.4, 5.5, 5.6, 5.7, 5.75, 5.8, 5.9, 5.91, 5.95, 5.99, 6, 6.1, 6.5, 7, or 8 percent by weight. The rodenticide composition can include the hypercalcemia promoter in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the hypercalcemia promoter in a percentage by weight of about 0.05% to about 4%. In a most preferred range, the rodenticide composition can include the hypercalcemia promoter in a percentage by weight of about 0.1% to about 3%. In an exemplary embodiment, the hypercalcemia promoter can be included in the composition at about 1% of the composition by weight.

The source of cellulose is a composition or ingredient that further increases dehydration once consumed by the rodent as part of the composition. The source of cellulose is selected from among: carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, any other suitable source of cellulose, a combination of two or more of the foregoing, or any other suitable material derived from any of the foregoing. The corn cobs can be ground corn cobs. In certain exemplary embodiments, the source of cellulose can be one or more naturally occurring compositions or ingredients. In other embodiments, the source of cellulose can be one or more artificial or manmade compositions or ingredients. In still other embodiments, the source of cellulose can be a mixture of one or more naturally occurring compositions or ingredients and one or more artificial or manmade compositions or ingredients. When utilizing naturally occurring cellulosic materials, the source of cellulose can be presoaked to remove phytic acid present in the natural source of cellulose. Phytic acid is known to bind to dietary calcium, which could inhibit the composition from causing hypercalcemia after ingestion by the rodent.

In preferred embodiments of the rodenticide composition, the source of cellulose is selected from among corn cobs, carboxymethyl cellulose, or a combination of the foregoing. In the most preferred embodiments of the rodenticide composition, the source of cellulose is corn cobs.

The source of cellulose may be included in the rodenticide composition in a percentage by weight of about 20% to about 60%. For example, the source of cellulose may be incorporated into the rodenticide composition in about 15, 16, 17, 17.5, 18, 18.5, 18.75, 18.9, 18.99, 19, 19.01, 19.05, 19.1, 19.2, 19.25, 19.3, 19.4, 19.41, 19.45, 19.49, 19.5, 19.51, 19.55, 19.59, 19.6, 19.7, 19.75, 19.8, 19.9, 19.91, 19.95, 19.99, 20, 20.01, 20.1, 20.2, 20.25, 20.3, 20.4, 20.5, 20.6, 20.7, 20.75, 20.8, 20.9, 20.95, 20.99, 21, 22, 23, 24, 25, 26, 27, 28, 29, 30, 35, 36, 37, 37.5, 38, 38.9, 39, 39.1, 39.2, 39.25, 39.3, 39.4, 39.5, 39.6, 39.7, 39.75, 39.8, 39, 39.1, 39.2, 39.25, 39.3, 39.4, 39.45, 39.5, 39.51, 39.55, 39.6, 39.7, 39.75, 39.8, 39.9, 39.95, 39.99, 40, 40.01, 40.05, 40.09, 40.1, 40.2, 40.25, 40.3, 40.4, 40.5, 40.6, 40.7, 40.75, 40.8, 40.9, 41, 42, 43, 44, 45, 46, 47, 48, 49, 50, 51, 52, 53, 54, 55, 56, 57, 58, 59, 59.1, 59.2, 59.25, 59.3, 59.4, 59.5, 59.6, 59.7, 59.75, 59.8, 59.9, 59.91, 59.95, 59.99, 60, 60.01, 60.05, 60.09, 60.1, 60.2, 60.25, 60.3, 60.4, 60.41, 60.45, 60.5, 60.51, 60.55, 60.59, 60.6, 60.7, 60.75, 60.8, 60.9, 60.91, 60.95, 60.99, 61, 61.01, 61.1, 61.25, 61.5, 62, 63, 64, or 65 percent by weight. The rodenticide composition can include the source of cellulose in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the source of cellulose in a percentage by weight of about 20% to about 60%. In a most preferred range, the rodenticide composition can include the source of cellulose in a percentage by weight of about 30% to about 50%. In an exemplary embodiment, the source of cellulose can be included in the composition at about 40% of the composition by weight.

In some embodiments, the rodenticide can also include a composition or an ingredient that is an irritant for causing additional digestive stress. The irritant is selected from among: fish oil, caffeine, coffee grounds, sodium nitrite, citric acid, soybean oil, a magnesium-containing compound, any other suitable irritant, a combination of two or more of the foregoing, or any other suitable material derived from any of the foregoing. In certain exemplary embodiments, the irritant can be one or more naturally occurring compositions or ingredients. In other embodiments, the irritant can be one or more artificial or manmade compositions or ingredients. In still other embodiments, the irritant can be a mixture of one or more naturally occurring compositions or ingredients and one or more artificial or manmade compositions or ingredients. Some embodiments of the rodenticide composition may not include an irritant.

The magnesium-containing compound included in the rodenticide composition as an irritant is selected from among: magnesium sulfate, magnesium chloride, magnesium carbonate, magnesium bicarbonate, magnesium phosphate, magnesium hydroxide, magnesium oxide, any other suitable magnesium-containing compound, vinegar, ammonium benzoate, a combination of two or more of the foregoing, or any other suitable material derived from any of the foregoing.

In preferred embodiments of the rodenticide composition, the irritant is selected from among citric acid, coffee grounds, or both. In the most preferred embodiments of the rodenticide composition, the irritant is citric acid.

The irritant may be included in the rodenticide composition in a percentage by weight of about 0.25% to about 5%. For example, the irritant may be incorporated into the rodenticide composition in about 0.001, 0.005, 0.009, 0.01, 0.015, 0.019, 0.02, 0.025, 0.03, 0.04, 0.05, 0.06, 0.07, 0.08, 0.09, 0.095, 0.099, 0.1, 0.101, 0.105, 0.11, 0.12, 0.13, 0.14, 0.15, 0.16, 0.17, 0.18, 0.19, 0.195, 0.199, 0.2, 0.201, 0.205, 0.21, 0.22, 0.225, 0.23, 0.24, 0.241, 0.245, 0.249, 0.25, 0.251, 0.255, 0.26, 0.27, 0.275, 0.28, 0.29, 0.291, 0.295, 0.299, 0.3, 0.31, 0.32, 0.325, 0.33, 0.34, 0.35, 0.36, 0.37, 0.375, 0.38, 0.39, 0.4, 0.41, 0.45, 0.49, 0.5, 0.51, 0.55, 0.59, 0.6, 0.7, 0.75, 0.8, 0.9, 0.91, 0.95, 0.99, 1, 1.01, 1.1, 1.2, 1.25, 1.3, 1.4, 1.5, 1.6, 1.7, 1.75, 1.8, 1.9, 1.95, 1.99, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 3.95, 3.99, 4, 4.01, 4.05, 4.09, 4.1, 4.15, 4.19, 4.2, 42.25, 4.3, 4.4, 4.5, 4.6, 4.7, 4.75, 4.8, 4.9, 4.95, 4.99, 5, 5.01, 5.05, 5.09, 5.1, 5.2, 5.25, 5.3, 5.4, 5.5, 5.6, 5.7, 5.75, 5.8, 5.9, 5.91, 5.95, 5.99, 6, 6.1, 6.5, 7, 8, 9, or 10 percent by weight. The rodenticide composition can include the irritant in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the irritant in a percentage by weight of about 0.25% to about 5%. In a most preferred range, the rodenticide composition can include the irritant in a percentage by weight of about 0.5% to about 3%. In an exemplary embodiment, the irritant can be included in the composition at about 1% of the composition by weight.

In some embodiments, the rodenticide can also include a composition or an ingredient that is a non-water soluble material that is a weathering agent for inhibiting deterioration in wet and damp environments. The non-water soluble material imparts weather resistance characteristics to the rodenticide composition so that the rodenticide to slow degradation of the rodenticide when it is exposed to the elements such as water (e.g., rain, dew, or other moisture). The non-water soluble material is selected from among: beeswax, paraffin wax, soybean oil, an ester of ammonia, an ester of butyl, an ester of calcium, an ester of glyceryl, fish oil, ammonium stearate, animal glue, any other suitable non-water soluble composition, a combination of two or more of the foregoing, or any other suitable material derived from any of the foregoing. In certain exemplary embodiments, the non-water soluble material can be one or more naturally occurring compositions or ingredients. In other embodiments, the non-water soluble material can be one or more artificial or manmade compositions or ingredients. In still other embodiments, the non-water soluble material can be a mixture of one or more naturally occurring compositions or ingredients and one or more artificial or manmade compositions or ingredients. The non-water soluble material can be included as an ingredient of the rodenticide, or the non-water soluble material can be applied to the rodenticide, e.g., by pouring or spraying it onto the rodenticide. Some embodiments of the rodenticide composition may not include a non-water soluble material.

In preferred embodiments of the rodenticide composition, the non-water soluble material is selected from among beeswax, paraffin wax, or both. In the most preferred embodiments of the rodenticide composition, the non-water soluble material is paraffin wax.

The non-water soluble material may be included in the rodenticide composition in a percentage by weight of about 2% to about 10%. For example, the non-water soluble material may be incorporated into the rodenticide composition in about 0.1, 0.101, 0.105, 0.11, 0.12, 0.13, 0.14, 0.15, 0.16, 0.17, 0.18, 0.19, 0.195, 0.199, 0.2, 0.201, 0.205, 0.21, 0.22, 0.225, 0.23, 0.24, 0.241, 0.245, 0.249, 0.25, 0.251, 0.255, 0.26, 0.27, 0.275, 0.28, 0.29, 0.291, 0.295, 0.299, 0.3, 0.31, 0.32, 0.325, 0.33, 0.34, 0.35, 0.36, 0.37, 0.375, 0.38, 0.39, 0.4, 0.41, 0.45, 0.49, 0.5, 0.51, 0.55, 0.59, 0.6, 0.7, 0.75, 0.8, 0.9, 0.91, 0.95, 0.99, 1, 1.01, 1.1, 1.2, 1.25, 1.3, 1.4, 1.5, 1.6, 1.7, 1.75, 1.8, 1.9, 1.95, 1.99, 2, 2.1, 2.2, 2.25, 2.3, 2.4, 2.5, 2.6, 2.7, 2.75, 2.8, 2.9, 2.91, 2.95, 2.99, 3, 3.1, 3.15, 3.19, 3.2, 3.25, 3.3, 3.4, 3.5, 3.6, 3.7, 3.75, 3.8, 3.9, 3.95, 3.99, 4, 4.01, 4.05, 4.09, 4.1, 4.15, 4.19, 4.2, 42.25, 4.3, 4.4, 4.5, 4.6, 4.7, 4.75, 4.8, 4.9, 4.95, 4.99, 5, 5.01, 5.05, 5.09, 5.1, 5.2, 5.25, 5.3, 5.4, 5.5, 5.6, 5.7, 5.75, 5.8, 5.9, 5.91, 5.95, 5.99, 6, 6.1, 6.2, 6.25, 6.3, 6.4, 6.5, 6.6, 6.7, 6.75, 6.8, 6.9, 6.91, 6.95, 6.99, 7, 7.01, 7.09, 7.1, 7.15, 7.2, 7.25, 7.3, 7.4, 7.5, 7.6, 7.7, 7.75, 7.8, 7.9, 7.95, 7.99, 8, 8.1, 8.2, 8.25, 8.3, 8.4, 8.5, 8.6, 8.7, 8.75, 8.8, 8.9, 9, 9.1, 9.2, 9.25, 9.3, 9.4, 9.5, 9.6, 9.7, 9.75, 9.8, 9.9, 9.91, 9.95, 9.99, 10, 10.1, 10.2, 10.25, 10.3, 10.4, 10.5, 10.6, 10.7, 10.75, 10.8, 10.9, 11, 12, 13, 14, or 15 percent by weight. The rodenticide composition can include the non-water soluble material in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the non-water soluble material in a percentage by weight of about 2% to about 10%. In a most preferred range, the rodenticide composition can include the non-water soluble material in a percentage by weight of about 3% to about 7%. In an exemplary embodiment, the non-water soluble material can be included in the composition at about 5% of the composition by weight.

In some embodiments, the rodenticide can also include a composition or an ingredient that is a flavoring to serve as an attractant to rodents. The flavoring is selected from among: cocoa, peanut butter, cheese, egg yolk, sulfur, fish oil, fish meal, dimethyl disulfide, syrup, peanuts, sorbitol, sucralose, sucrose, fructose, molasses, cat food, malt flavor, nutria meat, dried blood, any other suitable flavoring, a combination of two or more of the foregoing, or any other suitable material derived from any of the foregoing. In other embodiments, the flavoring can be one or more artificial or manmade compositions or ingredients. In still other embodiments, the flavoring can be a mixture of one or more naturally occurring compositions or ingredients and one or more artificial or manmade compositions or ingredients. Some embodiments of the rodenticide composition may not include a flavoring.

In preferred embodiments of the rodenticide composition, the flavoring is selected from among sorbitol, fructose, natural cheese, egg yolk, or a combination of two or more of the foregoing. In the most preferred embodiments of the rodenticide composition, the flavoring is selected from among natural cheese, egg yolk, or both because they also aid in the promotion of hypercalcemia due to their naturally occurring cholecalciferol content.

The flavoring may be included in the rodenticide composition in a percentage by weight of about 0.5% to about 6%. For example, the flavoring may be incorporated into the rodenticide composition in about 0.001, 0.005, 0.009, 0.01, 0.015, 0.019, 0.02, 0.025, 0.03, 0.035, 0.039, 0.04, 0.041, 0.042, 0.0425, 0.043, 0.044, 0.045, 0.046, 0.047, 0.0475, 0.048, 0.049, 0.0491, 0.0495, 0.0499, 0.05, 0.0501, 0.0505, 0.0509, 0.051, 0.052, 0.0525, 0.053, 0.054, 0.055, 0.056, 0.057, 0.0575, 0.058, 0.059, 0.0591, 0.0595, 0.0599, 0.06, 0.061, 0.065, 0.069, 0.07, 0.08, 0.09, 0.095, 0.099, 0.1, 0.101, 0.105, 0.11, 0.12, 0.13, 0.14, 0.15, 0.16, 0.17, 0.18, 0.19, 0.195, 0.199, 0.2, 0.201, 0.205, 0.21, 0.22, 0.225, 0.23, 0.24, 0.241, 0.245, 0.249, 0.25, 0.251, 0.255, 0.26, 0.27, 0.275, 0.28, 0.29, 0.291, 0.295, 0.299, 0.3, 0.31, 0.32, 0.325, 0.33, 0.34, 0.35, 0.36, 0.37, 0.375, 0.38, 0.39, 0.4, 0.41, 0.45, 0.49, 0.5, 0.51, 0.55, 0.59, 0.6, 0.7, 0.75, 0.8, 0.9, 0.91, 0.95, 0.99, 1, 1.01, 1.1, 1.2, 1.25, 1.3, 1.4, 1.5, 1.6, 1.7, 1.75, 1.8, 1.9, 1.95, 1.99, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 3.95, 3.99, 4, 4.01, 4.05, 4.09, 4.1, 4.15, 4.19, 4.2, 42.25, 4.3, 4.4, 4.5, 4.6, 4.7, 4.75, 4.8, 4.9, 4.95, 4.99, 5, 5.01, 5.05, 5.09, 5.1, 5.2, 5.25, 5.3, 5.4, 5.5, 5.6, 5.7, 5.75, 5.8, 5.9, 5.91, 5.95, 5.99, 6, 6.1, 6.2, 6.25, 6.3, 6.4, 6.5, 6.6, 6.7, 6.75, 6.8, 6.9, 6.91, 6.95, 6.99, 7, 7.01, 7.09, 7.1, 7.15, 7.2, 7.25, 7.3, 7.4, 7.5, 7.6, 7.7, 7.75, 7.8, 7.9, 7.95, 7.99, 8, 8.1, 8.2, 8.25, 8.3, 8.4, 8.5, 8.6, 8.7, 8.75, 8.8, 8.9, 9, 9.1, 9.2, 9.25, 9.3, 9.4, 9.5, 9.6, 9.7, 9.75, 9.8, 9.9, 9.91, 9.95, 9.99, 10, 10.1, 10.2, 10.25, 10.3, 10.4, 10.5, 10.6, 10.7, 10.75, 10.8, 10.9, 11, 12, 13, 14, or 15 percent by weight. The rodenticide composition can include the flavoring in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit. In a preferred range, the rodenticide composition can include the flavoring in a percentage by weight of about 0.5% to about 6%. In a most preferred range, the rodenticide composition can include the flavoring in a percentage by weight of about 1% to about 4%. In an exemplary embodiment, the flavoring can be included in the composition at about 2% of the composition by weight.

In some exemplary embodiments, the rodenticide composition further includes one or more coloring agents. The coloring agent of the rodenticide is selected from among: FD&C Red No. 3, FD&C Red No. 40, red cabbage color, FD&C Yellow No. 5, FD&C Yellow No. 6, FD&C Blue No. 1, C.I. Pigment Blue No. 29, FD&C Blue No. 2, FD&C Green No. 3, any other suitable coloring agent, a combination of two or more of the foregoing, or any other suitable material derived from any of the foregoing. In other embodiments, the coloring agent can be one or more artificial or manmade compositions or ingredients. In still other embodiments, the coloring agent can be a mixture of one or more naturally occurring compositions or ingredients and one or more artificial or manmade compositions or ingredients. Some embodiments of the rodenticide composition may not include a coloring agent.

In preferred embodiments of the rodenticide composition, the coloring agent is selected from among any red coloring agent above or a combination of two or more red coloring agents, any yellow color agent above or a combination of two or more yellow coloring agents, or a combination of two or more of the foregoing. Rodents, and rats and mice in particular, are attracted to the color red, and to a lesser degree, to the color yellow. In the most preferred embodiments of the rodenticide composition, the coloring agent is red cabbage color.

In one embodiment, the rodenticide includes: a dehydrant that includes cellulose fibers, silica gel, perlite, sodium chloride, or combinations thereof; a composition for producing endogenous gas, wherein the gas is oxygen and the composition for producing endogenous gas is selected from among calcium percarbonate, calcium peroxide, or combinations thereof; a dietary emulsifier that includes carboxymethyl cellulose, polyoxyethylene (20) sorbitan monooleate, or both; a hypercalcemia promoter that includes a mixture of calcium carbonate and cholecalciferol; an irritant; and a source of cellulose. In exemplary embodiments of this composition, the dehydrant includes cellulose fibers, silica gel, or both. In exemplary embodiments of this composition, the composition for producing endogenous gas is calcium percarbonate. In exemplary embodiments of this composition, the dietary emulsifier is polyoxyethylene (20) sorbitan monooleate. In exemplary embodiments of this composition, the hypercalcemia promoter includes a mixture of calcium carbonate, cholecalciferol, and L-lysine. In exemplary embodiments of this composition, the source of cellulose includes corn cobs, carboxymethyl cellulose, or both. In some embodiments of this composition, the rodenticide may further include an irritant. The irritant can be citric acid, coffee grounds, or both. In some embodiments of this composition, the rodenticide may also include a non-water soluble material that inhibits deterioration in wet and damp environments.

In another embodiment, the rodenticide includes a mixture of: a dehydrant that includes cellulose fibers, silica gel, or combinations thereof; a composition for producing endogenous gas, wherein the gas is oxygen and the composition for producing endogenous gas is calcium percarbonate; a dietary emulsifier that is polyoxyethylene (20) sorbitan monooleate; a hypercalcemia promoter that includes a mixture of calcium carbonate, cholecalciferol, and L-lysine; an irritant that includes fish oil, caffeine, coffee grounds, sodium nitrite, citric acid, soybean oil, a magnesium-containing compound, combinations thereof, or any other suitable material derived from any of the foregoing; and a source of cellulose. In exemplary embodiments of this composition, the irritant includes citric acid, coffee grounds, or both. In exemplary embodiments of this composition, the source of cellulose includes corn cobs, carboxymethyl cellulose, or both. In exemplary embodiments of this composition, the rodenticide composition further includes a non-water soluble material that inhibits deterioration in wet and damp environments.

The rodenticide composition can be produced as cakes, caplets, cookies, pellets, powders, tablets, or any other suitable form for consumption by rodents for which extermination is desired.

Example 1

One exemplary embodiment of the rodenticide composition includes perlite at 43% by weight, calcium peroxide at 6% by weight, cellulose at 46% by weight, magnesium carbonate at 1% by weight, cholecalciferol at 0.5% by weight, L-lysine at 1.5% by weight, and cheese flavoring at 2% by weight.

Example 2

Another exemplary embodiment of the rodenticide composition includes alpha cellulose at 86% by weight, sodium perborate at 5% by weight, carboxymethyl cellulose at 1% by weight, coffee grounds at 3% by weight, calcium citrate at 1.2% by weight, ergocalciferol at 0.8% by weight, and peanut butter flavoring at 3% by weight.

Example 3

Another exemplary embodiment of the rodenticide composition includes silica gel at 27.5% by weight, magnesium percarbonate at 4% by weight, polysorbate-80 at 2% by weight, caffeine at 0.5% by weight, calcium citrate at 2% by weight, L-Lysine at 1% by weight, cellulose at 60% by weight, and cocoa at 3% by weight.

Rodenticide Composition

A rodenticide composition useful for exterminating rodents (i.e., mammals that are species of the order Rodentia) is described along with a method for using the same to exterminate rodents. In some embodiments, the rodenticide can be produced using all-natural ingredients, and therefore, is non-toxic and safe if contacted or consumed by humans and other animals. Exemplary embodiments of the composition are produced using no synthetic ingredients. In other embodiments, the rodenticide composition can be manufactured using synthetic ingredients or a combination of synthetic and natural ingredients. In all exemplary embodiments, whether they include synthetic ingredients or not, the rodenticide composition is non-toxic if ingested and safe if contacted by humans or animals.

The rodenticide composition features a mixture of a dehydrant for causing dehydration in a rodent; a water-absorbent, hygromorphic carrier for absorbing water and expanding after consumption by the rodent; and a flavoring composition. A hygromorphic carrier is a composition or material that changes in size, shape, or both when exposed to water or moisture, for example, as in the digestive system of a rodent. In most embodiments, the carrier is hygroexpansive meaning that it expands upon contact with water or moisture. The carrier can be a source of cellulose or a non-cellulosic material. After consumption of the rodenticide composition by a rodent, the dehydrant and carrier cause the rodent to experience dehydration and the carrier expands within the digestive system to cause digestive or gastric pain, discomfort, or stress, to prevent the composition from being passed out of the bowels of the rodent by defecation, and in some cases, to cause internal damage to the rodent due to enlargement of the composition within the rodent's digestive system. As explained elsewhere herein, most species of rodents are unable to vomit, and once the composition is consumed, the rodent is unable to pass the expanded composition out of its body due to the hygroexpansive nature of the carrier, which expands and changes size within the rodent's gut. These characteristics of the composition may also cause bowel obstruction or starvation of the rodent as it is unable to consume additional food. Due to the effects caused by its ingredients, as a whole, the rodenticide composition is water-absorbent (and thus, dehydrating) and hygromorphic (and more particularly, hygroexpansive).

The rodenticide composition may also include one or more irritants (such as those described elsewhere herein) that causes digestive stress to the rodent, which further stresses and dehydrates the rodent. Irritants that are used in exemplary embodiments of the rodenticide composition described hereafter include citric acid, calcium carbonate, coffee grounds, and combinations of two or more of the foregoing. One or more coloring agents and weather resistant materials may also be added to the rodenticide composition.

In exemplary embodiments, the water-absorbent, hygromorphic carrier is a source of cellulose or a source of chitin. The rodenticide composition can include a single carrier or two, three, four, five, or more carriers. In more exemplary embodiments, the carrier is a source of alpha cellulose. In some exemplary embodiments, the carrier includes both a source of cellulose and a source of chitin. In other embodiments, the carrier is a non-cellulosic composition, substance, or material that also does not contain chitin, e.g., fish meal. In still other embodiments, the rodenticide composition includes a carrier that includes both a cellulosic carrier and a non-cellulosic carrier such as, for example, a carrier that includes alpha cellulose and mushroom or a carrier that includes alpha cellulose and fish meal. Examples of suitable cellulosic carriers include a grain-based cellulosic composition, a nut-based cellulosic composition, a legume-based cellulosic composition, a starchy tuber-based cellulosic composition, cellulose fibers, carboxymethyl cellulose, cardboard, cellulose acetate, regenerated cellulose, hydroxyethyl cellulose, hydroxypropyl cellulose, hydroxypropylmethyl cellulose, methylcellulose, pectin, sodium carboxymethyl cellulose, cornmeal, corn grits, corn cobs, corn gluten meal, any other suitable source of cellulose, a combination of two or more of the foregoing, or any other suitable material derived from any of the foregoing. Examples of non-cellulosic, non-chitin carriers useful for inclusion in the rodenticide composition, either alone or in combination with other cellulosic or chitin-containing carriers, include fish meal, a meat-based cat food, a fish-based cat food, or a combination of two or more of the foregoing. In embodiments that include a cat food, a fish-based cat food is preferred over a meat-based cat food. Some embodiments of the rodenticide composition may include one or more carriers described elsewhere herein.

The source of chitin used as or as part of a carrier of the rodenticide composition can be portabella, shiitake, another mushroom, another fungus, derivatives of any of the foregoing, or a combination of two or more of the foregoing. The source of chitin can be fungal or non-fungal in origin.

In the most exemplary embodiments of the composition, the carrier is corn cobs, fish meal, or both. In an exemplary embodiment that is preferred, the carrier includes a mixture of a source of alpha cellulose (preferably corn cobs) and fish meal.

The rodenticide composition can include a single dehydrant or two, three, four, five, or more dehydrants. Examples of compositions, substances, and materials suitable for use as or as part of the dehydrant of the rodenticide composition include a grain-based cellulosic composition, a nut-based cellulosic composition, a legume-based cellulosic composition, a starchy tuber-based cellulosic composition, activated alumina, aerogel, benzophenone, bentonite clay, calcium chloride, calcium sulfate, caramel, cellulose fibers, cobalt (II) chloride, copper (II) sulfate, ethanol, glycerol, honey, lithium bromide, lithium chloride, magnesium perchlorate, magnesium sulfate, methanol, perlite, potassium carbonate, potassium hydroxide, silica, silica gel, fumed silica, sodium, sodium chlorate, sodium chloride, sodium hydroxide, sucrose, sulfuric acid, vermiculite, zinc chloride, any other suitable dehydrant, a combination of two or more of the foregoing, or any other suitable material derived from any of the foregoing. In exemplary embodiments, the dehydrant is sodium chloride or perlite. Some embodiments of the rodenticide composition may include one or more dehydrants described elsewhere herein.

Some carriers described herein also act as dehydrants while some dehydrants described herein also function as carriers.

In more exemplary embodiments of the composition, the dehydrant is cellulose (including, for example, cellulose fibers), a silica compound (including, for example, silica gel), perlite, a chloride compound (including, for example, sodium chloride), sucrose, or a combination of two or more of the foregoing. In the most exemplary embodiments of the composition, the dehydrant is sodium chloride, perlite, or both. In another very exemplary embodiment, the dehydrant is cellulose, sodium chloride, perlite, or a combination of two or more of the foregoing. In the most preferred embodiments of the rodenticide composition, the dehydrant is a source of alpha cellulose.

The rodenticide composition can include a single flavoring composition or two, three, four, five, or more flavoring compositions. The flavoring composition is necessary to include in the rodenticide composition as an attractant due both to taste and smell to encourage rodents to consume the composition. Examples of compositions, substances, and materials suitable for use as or as part of the flavoring composition of the rodenticide composition include cocoa, peanut butter, cheese, egg yolk, poultry egg powder, sulfur, fish oil, fish meal, dimethyl disulfide, syrup, peanuts, sorbitol, sucralose, sucrose, fructose, molasses, sweet molasses, soy molasses, cat food, malt flavor, nutria meat, dried blood, any other suitable flavoring, a combination of two or more of the foregoing, or any other suitable material derived from any of the foregoing. In exemplary embodiments, the flavoring composition is molasses, sweet molasses, soy molasses, or a combination of two or more of the foregoing. Some embodiments of the rodenticide composition may include one or more flavoring compositions described elsewhere herein.

Some flavoring compositions described herein also act as binding agents while some binding agents described herein also function as flavoring compositions. In embodiments of the rodenticide composition in which use of a binding agent is necessary (for example, in pelletized forms of the composition), the binding agent can be molasses, sweet molasses, soy molasses, or a combination of two or more of the foregoing. Embodiments of the rodenticide composition that include a binding agent (which is also a flavoring composition) may also include one, two, three, four, five, or more flavoring compositions in addition to the binding agent.

Binding agents that are not flavoring compositions may also be used to produce the rodenticide composition.

The rodenticide composition can further include an additional ingredient such as, for example, alfalfa, portabella, shiitake, another mushroom, another fungus, poultry egg powder, white bean, wheat germ oil, an irritant, or a combination of two or more of the foregoing. Use of white bean, wheat germ oil, or both allows the composition to be created without using synthetic flow agents. In preferred embodiments that include a single additional ingredient, the additional ingredient can be poultry egg powder or a mushroom or derivative thereof (e.g., portabella or shiitake). In preferred embodiments that include a combination of additional ingredients, the additional ingredient can be a mushroom or derivative thereof (e.g., portabella or shiitake) and poultry egg powder. In embodiments that include an additional ingredient, poultry egg powder is preferred as the additional ingredient, and poultry egg powder is also preferred as an additional ingredient as compared to embodiments of the rodenticide composition that include a combination of poultry egg powder and another additional ingredient such as, for example, a mushroom or derivative thereof.

The ingredients of the rodenticide composition identified for the various embodiments above also include derivatives of the compositions, substances, and materials listed above. For example, in an embodiment that includes a mushroom, the ingredient can be a compound, substance, or material that is a derivative of a mushroom.

One exemplary embodiment of the rodenticide composition includes a dehydrant; a water-absorbent, hygromorphic carrier; a binding agent; an optional flavoring composition; an additional carrier that includes a source of chitin; and poultry egg powder. The dehydrant in this embodiment includes cellulose fibers, silica gel, perlite, sodium chloride, or a combination of two or more of the foregoing. This embodiment of the rodenticide composition can also include an additional ingredient that is or includes alfalfa, white bean, wheat germ oil, an irritant, or a combination of two or more of the foregoing.

Another exemplary embodiment of the rodenticide composition includes: (1) a dehydrant in an amount of about 45 to about 55 percent by weight of the composition, wherein the dehydrant is or includes cellulose fibers, silica gel, or both; (2) a water-absorbent, hygromorphic carrier in an amount of about 38 to about 45 percent by weight of the composition, wherein the carrier is or includes a source of cellulose; and (3) a flavoring composition that is or includes a binding agent, in an amount of about 6.5 to about 7 percent by weight of the composition. The binding agent of this embodiment of the rodenticide composition can be or include molasses, sweet molasses, soy molasses, or a combination of two or more of the foregoing. This embodiment of the rodenticide composition can further include an additional ingredient that is or includes alfalfa, a source of chitin, poultry egg powder, white bean, wheat germ oil, an additional flavoring composition that is not a binding agent, an irritant, or a combination of two or more of the foregoing.

Another exemplary embodiment of the rodenticide composition includes: a dehydrant; a water-absorbent, hygromorphic carrier; a source of alpha cellulose; an irritant; whole egg solids; soybean oil; paraffin wax; fish meal; and sorbitol. The dehydrant in this embodiment of the rodenticide composition is or includes sodium chloride, cellulose fibers, silica gel, perlite, or a combination of two or more of the foregoing. The carrier of this embodiment of the rodenticide composition can be or include corn cobs, and the dehydrant can be or include sodium chloride.

Below, four various formulas of the rodenticide composition are described, which indicate the ingredients of the composition in percentages by weight for each ingredient compared to the total weight of the composition.

The rodenticide composition includes the dehydrant in an amount of about 21 to about 90 percent by weight of the composition, the carrier in an amount of about 30 to about 79 percent by weight of the composition, and the flavoring composition in an amount of about 5.5 to about 8 percent by weight of the composition. In one exemplary embodiment of this particular embodiment of the rodenticide composition, the carrier can include alfalfa in an amount of about 3 to about 14 percent by weight of the carrier, portabella in an amount of about 21 to about 30 percent by weight of the carrier, shiitake in an amount of about 21 to about 30 percent by weight of the carrier, and poultry egg powder in an amount of about 21 to about 25 percent by weight of the carrier.

In exemplary embodiments, the rodenticide composition includes the dehydrant in an amount of about 30 to about 65 percent by weight of the composition, the carrier in an amount of about 32 to about 51 percent by weight of the composition, and the flavoring composition in an amount of about 6 to about 7.5 percent by weight of the composition. In one exemplary embodiment of this particular embodiment of the rodenticide composition, the carrier can include alfalfa in an amount of about 3 to about 14 percent by weight of the carrier, portabella in an amount of about 21 to about 30 percent by weight of the carrier, shiitake in an amount of about 21 to about 30 percent by weight of the carrier, and poultry egg powder in an amount of about 21 to about 25 percent by weight of the carrier.

In more exemplary embodiments, the rodenticide composition includes the dehydrant in an amount of about 45 to about 55 percent by weight of the composition, the carrier in an amount of about 38 to about 45 percent by weight of the composition, and the flavoring composition in an amount of about 6.5 to about 7 percent by weight of the composition. In one exemplary embodiment of this particular embodiment of the rodenticide composition, the carrier can include alfalfa in an amount of about 3 to about 14 percent by weight of the carrier, portabella in an amount of about 21 to about 30 percent by weight of the carrier, shiitake in an amount of about 21 to about 30 percent by weight of the carrier, and poultry egg powder in an amount of about 21 to about 25 percent by weight of the carrier.

In one exemplary embodiment, the rodenticide composition includes the dehydrant in an amount of about 48 percent by weight of the composition, the carrier in an amount of about 43 percent by weight of the composition, and the flavoring composition in an amount of about 6.5 percent by weight of the composition. In one exemplary embodiment of this particular embodiment of the rodenticide composition, the carrier can include alfalfa in an amount of about 3 to about 14 percent by weight of the carrier, portabella in an amount of about 21 to about 30 percent by weight of the carrier, shiitake in an amount of about 21 to about 30 percent by weight of the carrier, and poultry egg powder in an amount of about 21 to about 25 percent by weight of the carrier.

Any of the four formulas of the rodenticide composition described above also may include one or more of the following ingredients in the following percentages by weight of the total weight of the composition: white bean in an amount of about 2 to about 8 percent by weight, wheat germ oil in an amount of about 6 to about 8 percent by weight of the composition, molasses in an amount of about 5 to about 8 percent by weight of the composition, sweet molasses in an amount of about 5 to about 8 percent by weight of the composition, and/or soy molasses in an amount of about 4 to about 7 percent by weight of the composition. The three molasses ingredients serve both as flavoring compositions and as binding agents in pelletized versions of the rodenticide composition.

The rodenticide composition can include the dehydrant in an amount of about 15, 16, 17, 18, 19, 20, 20.1, 20.5, 20.9, 21, 21.1, 21.5, 21.9, 22, 23, 24, 25, 30, 35, 40, 45, 50, 55, 60, 65, 70, 75, 80, 85, 86, 87, 88, 89, 89.1, 89.5, 89.9, 90, 901, 90.5, 90.9, 91, 92, 93, 94, or 95 percent by weight of the composition. The rodenticide composition can include the dehydrant in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

The rodenticide composition can include the carrier in an amount of about 25, 26, 27, 28, 29, 29.1, 29.5, 29.9, 30, 30.1, 30.5, 30.9, 31, 32, 33, 34, 35, 40, 45, 50, 55, 60, 65, 70, 74, 75, 76, 77, 78, 78.1, 78.5, 78.9, 79, 79.1, 79.5, 79.9, 80, 81, 82, 83, 84, or 85 percent by weight of the composition. The rodenticide composition can include the carrier in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

The rodenticide composition can include the flavoring composition in an amount of about 3, 3.25, 3.5, 3.75, 3.9, 4, 4.1, 4.25, 4.5, 4.75, 4.9, 5, 5.1, 5.2, 5.3, 5.4, 5.41, 5.45, 5.49, 5.5, 5.51, 5.55, 5.59, 5.6, 5.7, 5.75, 5.8, 5.9, 6, 6.1, 6.2, 6.25, 6.3, 6.4, 6.5, 6.75, 7, 7.1, 7.2, 7.25, 7.3, 7.4, 7.5, 7.6, 7.7, 7.75, 7.8, 7.9, 7.91, 7.95, 7.99, 8, 8.01, 8.05, 8.1, 8.2, 8.25, 8.3, 8.4, 8.5, 8.6, 8.7, 8.75, 8.8, 8.9, 9, 10, 11, 12, 13, 14, or 15 percent by weight of the composition. The rodenticide composition can include the flavoring composition in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

In some exemplary embodiments of the rodenticide composition, the carrier can include alfalfa in an amount of about 1, 1.1, 1.2, 1.3, 1.4, 1.5, 1.6, 1.7, 1.8, 1.9, 2, 2.1, 2.2, 2.25, 2.3, 2.4, 2.5, 2.6, 2.7, 2.75, 2.8, 2.9, 2.91, 2.95, 2.99, 3, 3.01, 3.05, 3.09, 3.1, 3.2, 3.25, 3.3, 3.4, 3.5, 3.6, 3.7, 3.75, 3.8, 3.9, 4, 4.5, 5, 5.5, 6, 6.5, 7, 7.5, 8, 8.5, 9, 9.5, 10, 10.5, 11, 11.5, 12, 12.5, 13, 13.1, 13.2, 13.25, 13.3, 13.4, 13.5, 13.6, 13.7, 13.75, 13.8, 13.9, 13.91, 13.95, 13.99, 14, 14.01, 14.05, 14.09, 14.1, 14.2, 14.25, 14.3, 14.4, 14.5, 14.6, 14.7, 14.75, 14.8, 14.9, 15, 16, 16.5, 17, 17.5, 18, 18.5, 19, 19.5, or 20 percent by weight of the carrier. The carrier of the rodenticide composition can include alfalfa in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

In some exemplary embodiments of the rodenticide composition, the carrier can include portabella mushroom or a derivative thereof in an amount of about 15, 15.5, 16, 16.5, 17, 17.5, 18, 18.5, 19, 19.5, 20, 20.1, 20.5, 20.9, 21, 21.1, 21.5, 21.9, 22, 22.5, 23, 23.5, 24, 24.5, 25, 25.5, 26, 26.5, 27, 27.5, 28, 28.5, 29, 29.1, 29.5, 29.9, 30, 30.1, 30.5, 30.9, 31, 31.5, 32, 32.5, 33, 33.5, 34, 34.5, or 35 percent by weight of the carrier. The carrier of the rodenticide composition can include portabella mushroom or a derivative thereof in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

In some exemplary embodiments of the rodenticide composition, the carrier can include shiitake mushroom or a derivative thereof in an amount of about 15, 15.5, 16, 16.5, 17, 17.5, 18, 18.5, 19, 19.5, 20, 20.1, 20.5, 20.9, 21, 21.1, 21.5, 21.9, 22, 22.5, 23, 23.5, 24, 24.5, 25, 25.5, 26, 26.5, 27, 27.5, 28, 28.5, 29, 29.1, 29.5, 29.9, 30, 30.1, 30.5, 30.9, 31, 31.5, 32, 32.5, 33, 33.5, 34, 34.5, or 35 percent by weight of the carrier. The carrier of the rodenticide composition can include shiitake mushroom or a derivative thereof in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

In some exemplary embodiments of the rodenticide composition, the carrier can include poultry egg powder in an amount of about 15, 15.5, 16, 16.5, 17, 17.5, 18, 18.5, 19, 19.5, 20, 20.1, 20.5, 20.9, 21, 21.1, 21.5, 21.9, 22, 22.5, 23, 23.5, 24, 24.1, 24.2, 24.25, 24.3, 24.4, 24.5, 24.6, 24.7, 24.75, 24.8, 24.9, 25, 25.1, 25.2, 25.25, 25.3, 25.4, 25.4, 25.5, 25.6, 25.7, 25.75, 25.8, 25.9, 26, 26.5, 27, 27.5, 28, 28.5, 29, 29.5, or 30 percent by weight of the carrier. The carrier of the rodenticide composition can include poultry egg powder in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

As mentioned previously above, some formulas of the rodenticide composition also may include one or more of the following ingredients in the following percentages by weight of the total weight of the composition:

(1) white bean in an amount of about 1, 1.1, 1.15, 1.2, 1.25, 1.3, 1.35, 1.4, 1.45, 1.5, 1.55, 1.6, 1.65, 1.7, 1.75, 1.8, 1.85, 1.9, 1.91, 1.92, 1.925, 1.93, 1.94, 1.95, 1.96, 1.97, 1.975, 1.98, 1.99, 2, 2.01, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3, 3.5, 4, 4.5, 5, 5.5, 6, 6.5, 7, 7.05, 7.1, 7.15, 7.2, 7.25, 7.3, 7.35, 7.4, 7.45, 7.5, 7.55, 7.6, 7.65, 7.7, 7.75, 7.8, 7.85, 7.9, 7.91, 7.95, 7.99, 8, 8.01, 8.05, 8.09, 8.1, 8.15, 8.2, 8.25, 8.3, 8.35, 8.4, 8.45, 8.5, 8.55, 8.6, 8.65, 8.7, 8.75, 8.8, 8.85, 8.9, 8.95, 9, 9.5, 10, 10.5, 11, 11.5, 12, 12.5, 13, 13.5, 14, 14.5, or 15 percent by weight. The rodenticide composition can include the white bean in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

(2) wheat germ oil in an amount of about 3, 4, 4.1, 4.25, 4.5, 4.75, 4.9, 5, 5.1, 5.2, 5.3, 5.4, 5.41, 5.45, 5.49, 5.5, 5.51, 5.55, 5.59, 5.6, 5.7, 5.75, 5.8, 5.9, 6, 6.1, 6.2, 6.25, 6.3, 6.4, 6.5, 6.75, 7, 7.1, 7.2, 7.25, 7.3, 7.4, 7.5, 7.6, 7.7, 7.75, 7.8, 7.9, 7.91, 7.95, 7.99, 8, 8.01, 8.05, 8.09, 8.1, 8.2, 8.25, 8.3, 8.4, 8.5, 8.6, 8.7, 8.75, 8.8, 8.9, 9, 10, 11, 12, 13, 14, or 15 percent by weight of the composition. The rodenticide composition can include the wheat germ oil in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

(3) molasses in an amount of about 3, 3.25, 3.5, 3.75, 3.9, 4, 4.1, 4.25, 4.5, 4.75, 4.9, 5, 5.1, 5.2, 5.3, 5.4, 5.41, 5.45, 5.49, 5.5, 5.51, 5.55, 5.59, 5.6, 5.7, 5.75, 5.8, 5.9, 6, 6.1, 6.2, 6.25, 6.3, 6.4, 6.5, 6.75, 7, 7.1, 7.2, 7.25, 7.3, 7.4, 7.5, 7.6, 7.7, 7.75, 7.8, 7.9, 7.91, 7.95, 7.99, 8, 8.01, 8.05, 8.09, 8.1, 8.2, 8.25, 8.3, 8.4, 8.5, 8.6, 8.7, 8.75, 8.8, 8.9, 9, 10, 11, 12, 13, 14, or 15 percent by weight of the composition. The rodenticide composition can include the molasses in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

(4) sweet molasses in an amount of about 3, 3.25, 3.5, 3.75, 3.9, 4, 4.1, 4.25, 4.5, 4.75, 4.9, 5, 5.1, 5.2, 5.3, 5.4, 5.41, 5.45, 5.49, 5.5, 5.51, 5.55, 5.59, 5.6, 5.7, 5.75, 5.8, 5.9, 6, 6.1, 6.2, 6.25, 6.3, 6.4, 6.5, 6.75, 7, 7.1, 7.2, 7.25, 7.3, 7.4, 7.5, 7.6, 7.7, 7.75, 7.8, 7.9, 7.91, 7.95, 7.99, 8, 8.01, 8.05, 8.09, 8.1, 8.2, 8.25, 8.3, 8.4, 8.5, 8.6, 8.7, 8.75, 8.8, 8.9, 9, 10, 11, 12, 13, 14, or 15 percent by weight of the composition. The rodenticide composition can include the sweet molasses in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

(5) soy molasses in an amount of about 1.5, 2, 2.25, 2.5, 2.75, 2.9, 3, 3.1, 3.2, 3.25, 3.3, 3.4, 3.5, 3.6, 3.7, 3.75, 3.8, 3.9, 3.91, 3.95, 3.99, 4, 4.01, 4.05, 4.09, 4.1, 4.2, 4.25, 4.3, 4.4, 4.5, 4.6, 4.7, 4.75, 4.8, 4.9, 5, 5.5, 6, 6.1, 6.2, 6.25, 6.3, 6.4, 6.5, 6.6, 6.7, 6.75, 6.8, 6.9, 6.91, 6.95, 6.99, 7, 7.01, 7.05, 7.09, 7.1, 7.2, 7.25, 7.3, 7.4, 7.5, 7.6, 7.7, 7.75, 7.8, 7.9, 8, 8.5, 9, 9.5, 10, 10.5, 11, 11.5, 12, 12.5, 13, 13.5, 14, 14.5, or 15 percent by weight of the composition. The rodenticide composition can include the soy molasses in a percentage by weight of about a lower limit to about an upper limit, wherein the lower limit is a percentage by weight selected from the foregoing percentages by weight and the upper limit is a percentage by weight selected from the foregoing percentages by weight that is higher than the lower limit.

In another exemplary embodiment, the rodenticide composition includes the following ingredients in percentages by weight:

(i) about 66.6% a water-absorbent, hygromorphic carrier
(ii) about 3% a dehydrant
(iii) about 16.4% a source of alpha cellulose
(iv) about 3% an irritant that includes citric acid, calcium carbonate, and coffee grounds
(v) about 1.5% whole egg solids
(vi) about 1% soybean oil
(vii) about 7% paraffin wax
(viii) about 1.3% fish meal
(ix) about 0.2% sorbitol.

In the exemplary composition above, the dehydrant includes sodium chloride, cellulose fibers, silica gel, perlite, or a combination of two or more of the foregoing. In a most preferred embodiment of the exemplary composition, the carrier is or includes corn cobs, and the dehydrant is or includes sodium chloride. In the example above, as percentages by total weight of the composition, the three irritant compositions are included in the rodenticide composition as about 2% citric acid, about 0.5% calcium carbonate, and about 0.5% coffee grounds.

The various embodiments of the rodenticide composition can be produced as cakes, caplets, cookies, pellets, powders, tablets, a ground or mashed form, a mixture of two or more of the foregoing, or any other suitable form for consumption by rodents for which extermination is desired.

The invention also features a method for exterminating rodents. The method includes the steps of preparing a rodenticide composition such as the ones described herein and placing an amount of the rodenticide composition sufficient to kill a rodent in an area in which the extermination of rodents is desired, wherein the rodent is killed after consuming the rodenticide composition. The rodenticide composition used in this method may include or have applied to it (by pouring, spraying, or other means) an irritant, a non-water soluble material that inhibits deterioration in wet and damp environments or both.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A rodenticide composition consisting of:
a dehydrant for causing dehydration in a rodent;
a water-absorbent, hygromorphic carrier, wherein the carrier is a compound that is different from the dehydrant, wherein the carrier consists of one or more compounds selected from the group consisting of: carboxymethyl cellulose, cellulose acetate, regenerated cellulose, hydroxyethyl cellulose, hydroxypropyl cellulose, and sodium carboxymethyl cellulose; and
a flavoring composition that consists of a binding agent.

2. A rodenticide composition consisting of:
a dehydrant for causing dehydration in a rodent, the composition consisting of the dehydrant in an amount of about 45 to about 55 percent by weight of the composition, wherein the dehydrant consists of cellulose fibers, silica gel, or both;
a water-absorbent, hygromorphic carrier in an amount of about 38 to about 45 percent by weight of the composition, wherein the carrier consists of a source of cellulose, wherein the carrier is a compound that is different from the dehydrant, wherein the carrier consists of one or more compounds selected from the group consisting of: carboxymethyl cellulose, cellulose acetate, regenerated cellulose, hydroxyethyl cellulose, hydroxypropyl cellulose, and sodium carboxymethyl cellulose; and
a flavoring composition that consists of a binding agent, in an amount of about 6.5 to about 7 percent by weight of the composition.

3. A method for exterminating rodents consisting of the steps of:
(a) preparing a rodenticide composition consisting of a mixture of:
a dehydrant for causing dehydration in a rodent;

a water-absorbent, hygromorphic carrier for absorbing water and expanding after consumption by the rodent, wherein the carrier is a compound that is different from the dehydrant, wherein the carrier consists of one or more compounds selected from the group consisting of: carboxymethyl cellulose, cellulose acetate, regenerated cellulose, hydroxyethyl cellulose, hydroxypropyl cellulose, hydroxypropylmethyl cellulose, methylcellulose, or sodium carboxymethyl cellulose; and a flavoring composition that consists of a binding agent; and (b) placing an amount of the rodenticide composition sufficient to kill the rodent in an area in which the extermination of rodents is desired, wherein the rodent is killed after consuming the rodenticide composition.

4. A rodenticide composition consisting of:

a dehydrant for causing dehydration in a rodent, wherein the dehydrant is a mixture of sodium chloride and glycerol;

a water-absorbent, hygromorphic carrier that is corn cobs; and a flavoring composition that is also a binding agent.

* * * * *